(12) United States Patent
Waechter et al.

(10) Patent No.: US 9,357,709 B2
(45) Date of Patent: Jun. 7, 2016

(54) COMBINATION OF A TOWING VEHICLE AND AN AGRICULTURAL HARVESTING MACHINE DRAWN THEREBY INCLUDING A CONTROL DEVICE FOR SPECIFYING A GROUND SPEED OF THE COMBINATION

(71) Applicant: CLAAS KGAA MBH, Harsewinkel (DE)

(72) Inventors: Julien Waechter, Failly (FR); Frédéric Chesnier, Norroy les Pont á Mousson (FR); Thorsten Scharf, Mettlach (DE)

(73) Assignee: USINES CLAAS FRANCE S.A.S., Woippy (FR)

( * ) Notice: Subject to any disclaimer, the term of this patent is extended or adjusted under 35 U.S.C. 154(b) by 155 days.

(21) Appl. No.: 14/160,836

(22) Filed: Jan. 22, 2014

(65) Prior Publication Data

US 2014/0208708 A1      Jul. 31, 2014

(30) Foreign Application Priority Data

Jan. 28, 2013   (DE) .......................... 10 2013 100 793

(51) Int. Cl.

| | |
|---|---|
| G06F 7/70 | (2006.01) |
| G06F 19/00 | (2011.01) |
| G06G 7/00 | (2006.01) |
| G06G 7/76 | (2006.01) |
| A01D 69/00 | (2006.01) |
| A01F 15/08 | (2006.01) |
| A01B 69/00 | (2006.01) |
| A01B 67/00 | (2006.01) |

(52) U.S. Cl.
CPC ............ *A01D 69/002* (2013.01); *A01B 69/007* (2013.01); *A01F 15/08* (2013.01); *A01F 15/0825* (2013.01); *A01B 67/00* (2013.01)

(58) Field of Classification Search
CPC ............ A01D 41/127; A10D 41/1274; A10D 34/008; F16H 59/44; F16H 2059/443; F16H 2059/446; G05D 2201/0201
USPC .......................... 701/50, 26, 93, 1; 56/10.2 R
See application file for complete search history.

(56) References Cited

U.S. PATENT DOCUMENTS

| | | | |
|---|---|---|---|
| 4,704,866 A * | 11/1987 | Myers .............................. | 60/449 |
| 5,551,218 A * | 9/1996 | Henderson et al. .............. | 53/504 |
| 6,315,658 B1 * | 11/2001 | Weber ................................ | 460/6 |
| 6,546,705 B2 * | 4/2003 | Scarlett et al. .............. | 56/10.2 R |
| 6,681,551 B1 * | 1/2004 | Sheidler et al. ............ | 56/10.2 G |
| 7,721,516 B2 * | 5/2010 | Wendling ............... | A01D 41/12 460/22 |
| 9,072,223 B2 * | 7/2015 | Baumgarten ........ | A01D 41/127 |
| 2003/0110748 A1 * | 6/2003 | Coers et al. ................ | 56/10.2 G |
| 2006/0123757 A1 * | 6/2006 | Baumgarten et al. ...... | 56/10.2 R |
| 2011/0238269 A1 * | 9/2011 | Martin ................. | A01B 79/005 701/50 |

(Continued)

*Primary Examiner* — Árpád Fábián-Kovács
(74) *Attorney, Agent, or Firm* — Michael J. Striker

(57) ABSTRACT

A combination of a towing vehicle and an agricultural harvesting machine drawn by the towing machine is provided. The harvesting machine includes at least one working assembly for conveying crop (G), for processing crop (G) or both. The harvesting machine also includes a working connection to the towing vehicle in order to be supplied with drive power by the towing vehicle in order to operate the at least one working assembly and a control device can be operated in a harvesting mode in order to specify a ground speed (v) for the combination depending on ascertained operating parameters of the harvesting machine and the towing vehicle.

18 Claims, 2 Drawing Sheets

(56) References Cited

U.S. PATENT DOCUMENTS

2013/0116895 A1* 5/2013 Smith .................. A01F 15/08
   701/50
2013/0197767 A1* 8/2013 Lenz .................... A01B 63/00
   701/50

\* cited by examiner

COMBINATION OF A TOWING VEHICLE AND AN AGRICULTURAL HARVESTING MACHINE DRAWN THEREBY INCLUDING A CONTROL DEVICE FOR SPECIFYING A GROUND SPEED OF THE COMBINATION

CROSS-REFERENCE TO A RELATED APPLICATION

The invention described and claimed hereinbelow is also described in German Priority Document DE 10 2013 1007937, filed on Jan. 28, 2013. The German Priority Document, the subject matter of which is incorporated herein by reference, provides the basis for a claim of priority of invention under 35 U.S.C. 119(a)-(d).

BACKGROUND OF THE INVENTION

The invention relates to a combination of a towing vehicle and an agricultural harvesting machine drawn thereby.

Agricultural harvesting machines such as balers or self-loading forage wagons, in particular, which are drawn across the field by a towing vehicle, are often used in the harvesting of green crop. Depending on the configuration and size, the harvesting machines also must be supplied with drive power by the towing vehicle in order to drive working assemblies of the harvesting machine that are used to convey and/or process the crop. In the case of a block baler, the working assemblies are, for example, the baling ram, the feed rake, possibly the cutting device, and the pick-up. Towing vehicles used in agriculture, such as tractors in particular, are equipped with a P.T.O. shaft outlet on the rear side for this purpose, which can be brought into a drive connection with a drive shaft assigned to the harvesting machine. The P.T.O. shaft outlet of the towing vehicle is usually driven by the (main) drive motor thereof. In this manner, the drive motor of the towing vehicle, the P.T.O. shaft outlet and the drive shaft of the harvesting machine form essential elements of a drive train for driving the working assemblies of the harvesting machine.

When a block baler drawn across the field by a tractor is used for harvesting, wherein the working assemblies of the block baler are driven by the tractor, it is difficult for the driver of the towing tractor to have a reliable overview of a large number of dynamically changing operating parameters, which play a role in the success of the harvesting process during the travel across the field. Factors such as the type, quantity, volume, moisture content or any other property of the picked-up crop, for example, greatly influence the harvesting process. Furthermore, machine-related factors affect the harvesting process, such as the power reserve and rotational speed of the drive engine of the tractor, the ground speed of the tractor (and the baler drawn thereby), the speed and load of individual working assemblies (e.g. pick-up, cutting rotor, feed rake, baling ram) of the press, etc.

The factors have a complex interaction with one another, in part, and usually change dynamically during the harvesting operation. Proceeding therefrom, a particular challenge for a driver is that of selecting a suitable ground speed. The selected ground speed must not be too high in order to ensure that the combination of tractor and baler can be operated during the harvesting operation with a sufficient power reserve of the drive motor in order to prevent the drive train from coming to a standstill and/or to prevent damage to the machine or injury to persons in the event that harvesting and/or operating conditions change abruptly.

In order to select such a speed that is "not too high", the driver must take a large number of factors into consideration. In practical application, this typically results in the driver selecting a ground speed for safety reasons that is lower than would be permitted by the actual conditions. The potential output of the combination cannot be fully utilized in this case. The driver must have a great deal of knowledge and experience in order to pursue further-reaching and/or alternative objectives during the harvesting operation. An unsuitable selection of the speed can also have further disadvantageous effects, such as a poorer quality of the pressed bales (poor bale shape, crushing the crop).

SUMMARY OF THE INVENTION

The present invention overcomes the shortcomings of known arts, such as those mentioned above.

To that end, the invention provides a combination of a towing vehicle and an agricultural harvesting machine drawn thereby, which relieves the driver in terms of selecting a suitable ground speed.

In an embodiment, the invention provides a combination of a towing vehicle and an agricultural harvesting machine drawn by the towing machine, the harvesting machine comprising at least one working assembly for conveying crop (G), for processing crop (G) or both, a working connection to the towing vehicle in order to be supplied with drive power by the towing vehicle in order to operate the at least one working assembly and a control device.

The control device can be operated in a harvesting mode in order to specify a ground speed for the combination depending on ascertained operating parameters of the harvesting machine and the towing vehicle. This feature ensures that the ground speed is selected with on-going consideration of factors that affect the entire combination. This has the advantage that machine standstills or damage due to working assemblies being overloaded is reliably prevented. In addition, when considering the towing vehicle and harvesting machine as a whole, the control device operates or controls operation to ensure that the combination continuously operates in a particularly efficient manner (for example, close to the limit of full capacity or the optimal quality thereof) even for less experienced drivers. The speed specification according to the invention provides clear relief for the driver.

According to a simple implementation, the invention provides that the ground speed is specified in the form of a recommendation to the driver, for example, in the sense of an optical display or an acoustic signal. The driver can decide for her/himself whether and to what extent she/he wants to implement this recommendation.

Alternatively, the ground speed specification is part of an automatic ground speed controller, which continuously and automatically regulates the specified ground speed. In this case, the driver is fully relieved of the task of selecting the ground speed when operating in the harvesting mode.

Advantageously, during operation in the harvesting mode, the ground speed specified by the control device is always selected such that the combination reaches at least one harvesting objective (which can be specified by the machine operator), while ensuring reliable operation by preventing working assemblies from being overloaded or any other undesired events. In specifying the ground speed, the control device then accounts for (at least) one harvesting objective. The control device attempts to select a ground speed at which a desired harvesting success is achieved to the greatest possible extent, proceeding from the background of the current operating parameter at the moment. This can be a single harvesting objective, such as achieving a high throughput rate or achieving a high quality or density.

Since various harvesting objectives often play a role simultaneously in practical application, the control device takes into account a plurality of harvesting objectives (e.g., simultaneously), whereby the machine operator can specify a weighting of the harvesting objectives relative to one another. In the case of a baler, it is thereby possible to simultaneously set a throughput goal and a quality goal, wherein the weighing, that is implemented makes it possible to prioritize the harvesting objectives with respect to one another. The at least one harvesting objective is advantageously that of achieving a high throughput rate, achieving a high crop quality or both, which can be achieved by maintaining a high density.

In order to determine a suitable ground speed, a plurality of ascertained operating parameters is advantageously fed to the control device. The ascertained operating parameters are detected via sensors. The term "operating parameters" is intended to be general, i.e., the operating parameters can be any type of influencing factors. The operating parameters are variables are associated with the harvesting process, machine components participating therein in a broader sense or both.

At least one, preferably several variables characterizing the mechanical load of one or more working assemblies, such as the speed, torque, working pressure and/or the like of these working assemblies, are taken into account as operating parameters of the harvesting machine.

At least one, preferably several variables related to the harvesting process, such as the moisture content of the crop, the crop volume, the bale density, the packet size (the size of the portion fed to the bale chamber, such, in turn, allows conclusions to be drawn regarding the crop density), the throughput or combinations thereof are furthermore taken into consideration as operating parameters of the harvesting machine.

Advantageously, the load of the drive engine of the towing vehicle, the current transmission ratio of the ground drive of the towing vehicle or both are taken into account as operating parameters of the towing vehicle. Further parameters such as the wheel slip, the remaining fuel reserve, etc. (without limitation), also are feasible.

In order to obtain the most accurate and comfortable speed specification possible, the control device accounts for technical characteristic data of the towing vehicle, the harvesting machine, the combination or some combination thereof in the specification of the ground speed. These characteristic data can be, for example, the engine power, the length, weight (or inertia) of the towing vehicle, the harvesting machine or a combination thereof. Accounting for such characteristic data simplifies the operation of a harvesting machine with different towing vehicles (and vice versa). The characteristic data is exchanged between the towing vehicle and the harvesting machine via a bus system.

In one embodiment, the control device is operated to set an upper limit for the ground speed if the value of an operating parameter or the values of a combination of operating parameters indicates that an overload is imminent or, indicates a generally undesired state of the harvesting machine, the towing vehicle, or the combination. This safety measure ensures that the ground speed is limited independently of possible harvesting objectives that are set in the event that limiting basic conditions are present. Limiting basic conditions include reaching the limit of engine load drop, exceeding a moisture content of crop, exceeding an incoming crop volume, exceeding a load on a working assembly, without limitation. Such ground speed limitation prevents all types of damage. Harvesting objectives that are set are therefore pursued only when none of the operating parameters poses a limitation.

In an embodiment, the ground speed specified by the control device depending on the ascertained operating parameters is based on empirically determined values.

The control device can have different configurations. Advantageously, the control device is assigned to the harvesting machine and is brought into a signal connection with the towing vehicle by a bus system in order to receive operating parameters ascertained on the towing vehicle. The assignment to the harvesting machine provides the advantage that the control device can be matched to and programmed for the special requirements and circumstances (large number of working assemblies, sensors) of the harvesting machine, which is often complex. In this case, the control device is capable of controlling the ground speed of the towing vehicle, which takes place via the bus system.

In order to ensure comfortable operation for a driver, an operating device is assigned to the control device. The operating device is preferably disposed in a driver's cab of the towing vehicle and can be brought into a communication connection with the control device.

The control device can be operated in a harvesting mode. In the harvesting mode, a ground speed is specified with consideration for the current operating parameters that is suitable for the harvesting operation including crop pick-up along a laid-down crop swath, for example. After such a swath has been processed, however, the combination regularly reaches a turnaround point (also referred to as "headland", "end of the field"). The crop pick-up is normally interrupted there, and the combination must undertake a turning maneuver in order to pick up the next swath. In order to drive the combination at a suitable ground speed in this situation as well, the invention provides that, as an alternative to the harvesting mode, the control device is operated in a turnaround mode. In the turnaround mode, the control device specifies a suitable ground drive for the combination in order to turn the combination around at the end of the field in a safe and comfortable manner. The ground speed specified can be preset by the driver, for example, according to his personal preference.

In order to ensure that the particular operating mode that is activated is easily controlled, the machine operator is enabled to manually initiate the switching between an operation of the control device in the harvesting mode and in the turnaround mode, by pressing a button, for example.

In an embodiment, at least the switching from the operation of the control device in the turnaround mode into the harvesting mode takes place automatically, in particular in an event-controlled manner. Preferably, the switching into the turnaround mode also takes place automatically. The switching between the operating modes can be triggered by different events, such as by the (e.g. camera-based) detection that crop is located in front of the harvesting machine and/or on machine elements of the harvesting machine once more (switch into the harvesting mode) or that crop is no longer located there (switch into the turnaround mode). As an alternative or in addition, the switching can be made dependent on certain positions (or edge regions) on the field having been reached, in particular, with utilization of position sensors such as satellite-based navigation (GPS).

BRIEF DESCRIPTION OF THE DRAWINGS

Further features and advantages of the invention will become apparent from the description of embodiments that follows, with reference to the attached figures, wherein.

DETAILED DESCRIPTION OF THE INVENTION

The following is a detailed description of example embodiments of the invention depicted in the accompanying drawings. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

Figure 1:
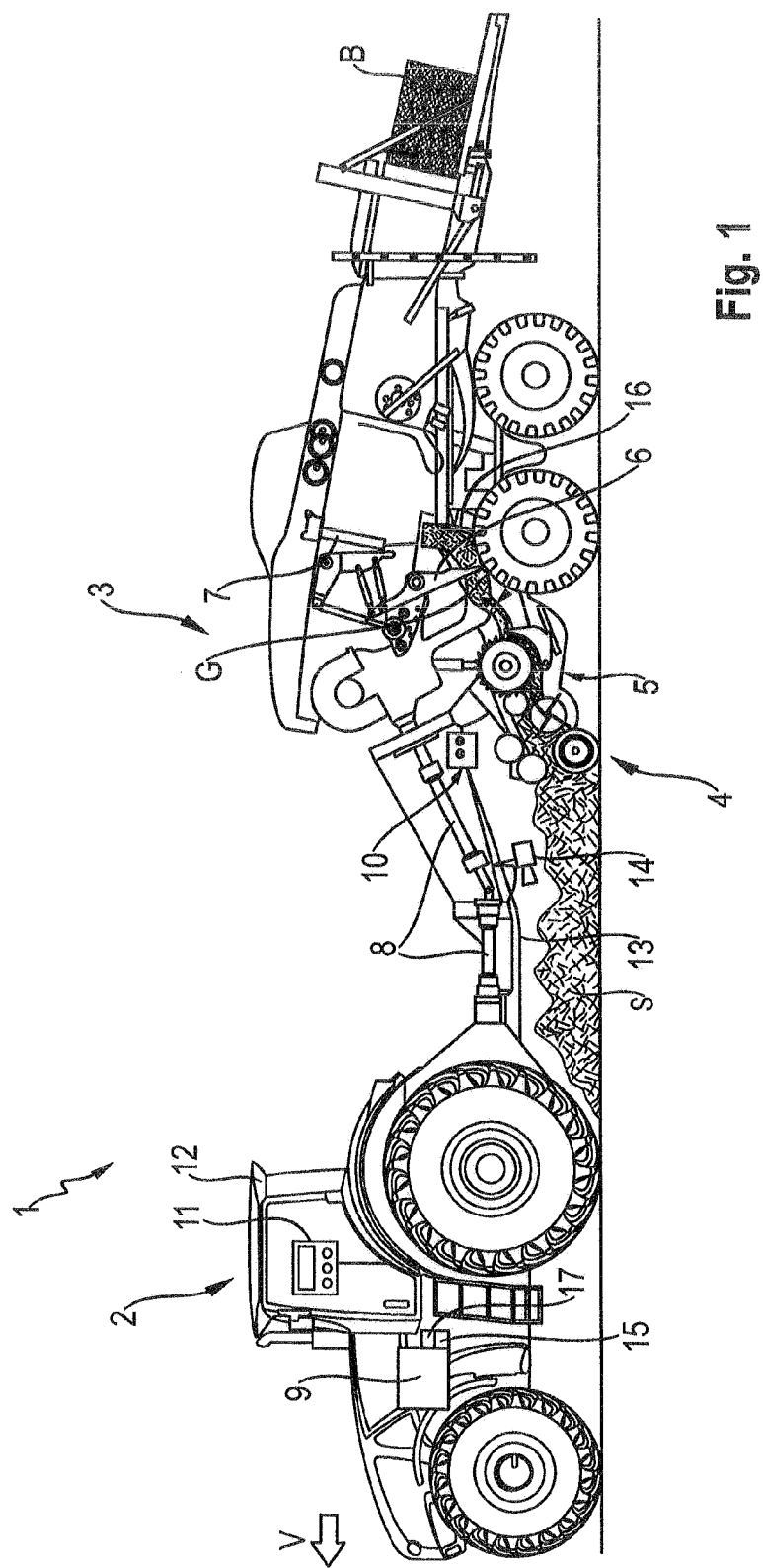
FIG. 1 depicts one embodiment of a combination according to the invention in a schematic side view during travel in the harvesting mode.

FIG. 1 presents a schematic side view of a combination 1 according to one embodiment of the invention. As shown therein, combination 1 comprises a towing vehicle in the form of a tractor 2 and an agricultural harvesting machine drawn thereby in the form of a (block) baler 3, during travel across a field. As an alternative to the baler 3, this could be a different type of drawn harvesting machine, which is equipped with a working assembly for conveying crop, processing crop or both, such as a self-loading forage harvester.

The harvesting machine, i.e., the baler 3 as shown, comprises various working assemblies 4, 5, 6, 7 for conveying crop, processing crop or both. A pick-up 4 is located at the front. By the pick-up, crop G laid down in the form of a swath S is picked up from the field, is guided together laterally and is conveyed into the crop channel of the baler 3 for further processing. The crop G then passes through a cutting device 5 equipped with a cutting rotor and precompressed by a feed rake 6, which undergoes periodic gathering and filling strokes, in order to be fed in portions (by means of a filling stroke of the feed rake 6 in each case) to a bale chamber. The bale chamber has a baling ram 7, which can move back and forth, that presses the crop G into bales B. Finished bales B leave the baler 3 at the rear.

The working assemblies 4, 5, 6, 7 of the baler 3 are provided with drive power via a drive shaft 8 of the tractor 2. The drive shaft 8 is connected to the P.T.O. shaft outlet at the rear of the tractor 2. To this end, the tractor 2 comprises a drive engine 9, which can be brought into a drive connection with the P.T.O. shaft outlet. The drive engine 9 of the tractor 2, the P.T.O. shaft outlet and the drive shaft 8 form a drive train for the baler 3. Gearboxes are used to distribute the power transferred to the baler 3 to the individual working assemblies thereof.

The drive engine of the tractor 2 also is part of a drive train of the ground drive of the tractor 2 in a manner known per se, that is, this drive engine is used to drive the wheels of the tractor 2. Depending on the engine speed of the drive engine 9 and on a selected transmission ratio, the tractor 2 tows the baler 3 across the field at a ground speed v indicated by an arrow.

The combination 1 is characterized by a control device 10, which specifies a ground speed v for the combination 1 depending on operating parameters of the harvesting machine 3 and the towing vehicle 2 that are ascertained while the harvesting operation is underway.

In the embodiment shown, the control device 10 is assigned to the baler 3 and is connected to the tractor 2 for data exchange via a data bus system 13, preferably ISOBUS. To this end, an operating unit 11, which is easily accessible by a driver, is disposed in the driver's cab 12 of the tractor 2. The operating unit communicates with the control device 10 via the data bus system 13. The operating unit 11 comprises control elements and a display, for depicting operating parameters. Furthermore, the control device 10 is connected to a ground speed regulator 17 of the tractor 2 via the data bus system 13 and can thereby influence this ground speed regulator. In other words, the harvesting machine 3 can specify a ground speed v to the tractor 2 by means of the signal connection between the control device 10 and the ground speed regulator 17.

The speed specification is based on dynamically ascertained operating parameters of the tractor 2 and the baler 3. To this end, the control device 10 is equipped with a plurality of signal inputs, wherein at least the signals incoming from the tractor 2 are fed to the control device 10 via the data bus 13. Cable connections between the tractor 2 and the baler 3 that go beyond the bus cable are therefore unnecessary.

The tractor 2 in the embodiment shown is equipped with a load sensor 15 of the drive engine 9. The current engine load detected in this manner is transmitted to the control device 10 via the data bus 13.

Advantageously, the current ground speed and/or the current transmission ratio of the ground drive of the tractor 2 or any other engine/transmission operating data could also be transmitted to the control device 10. The control device 10 also can receive further operating parameters of the tractor 2 via the data bus 13 that play a role in the specification of a ground speed v.

The baler 3 is equipped with a plurality of sensors, which ascertain different operating parameters of the baler 3. The sensors ascertain the load state of the working assemblies such as, the pick-up 4, the cutting device 5, the feed rake 6, and the baling ram 7. By detecting the speed, the drive torque or the working pressure of individual machine components (pick-up drum, cutting rotor, feed rake crank), the sensors directly or indirectly detect the load of associated working assemblies.

Furthermore, sensors are assigned to the baler in order to ascertain variables related to the harvesting process. These are, for example, a moisture sensor 16 for detecting the moisture content of the crop G, a camera 4 disposed in front of the pick-up 4 for ascertaining the cross section (and, therefore, the size) of the crop swath S to be picked up, a sensor for detecting the size of the particular crop packets fed to the bale chamber, and a throughput sensor for detecting the quantity of crop that is processed. Further sensors for detecting operating parameters are feasible.

Since the control device 10 continuously receives the values of the ascertained operating parameters, the control device can then specify a ground speed v depending on the harvesting conditions and the performance capacity of the tractor 2 and the baler 3.

Figure 2:
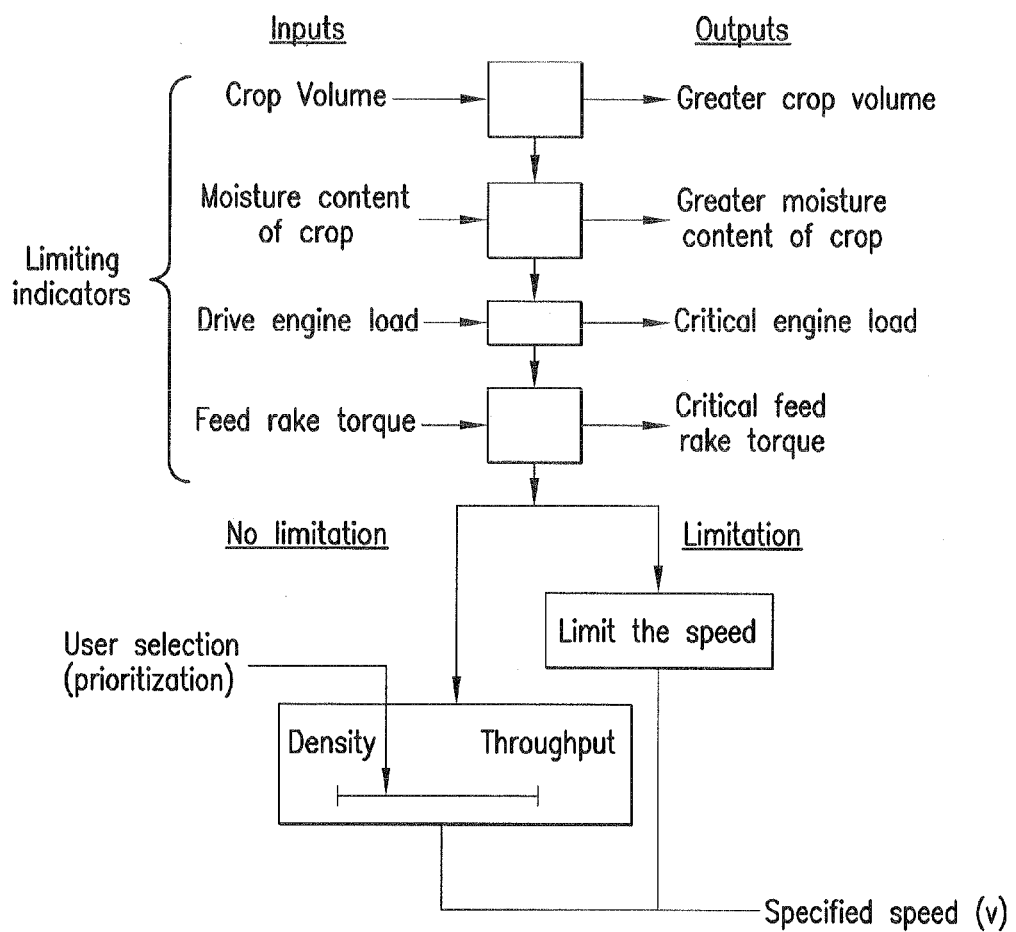
FIG. 2 presents a functional diagram illustrating ground speed specification for the combination depicted in the FIG. 1 embodiment.

The control device 10 can be operated in two operating modes. The "harvesting mode" is activated for the harvesting travel along a swath 5, as depicted in FIG. 1. FIG. 2 shows a schematic representation of a functional diagram to explain the ground speed specification in the harvesting mode, i.e., for the harvesting travel situation of the combination 1 shown in FIG. 1. Four limiting indicators are shown in the upper region, as examples: 1.) crop volume (to be picked up), 2.) moisture content of the crop, 3.) drive engine load and 4.) feed rake torque.

Each of the indicators (further indicators are feasible) is an input variable in the control process and is continuously evaluated. When a critical value is reached (output: 1.) greater crop volume, 2.) greater moisture content of crop, 3.) critical engine load, 4.) critical torque of the feed rake), it is detected or determined that a limit has been reached. In this case, the ground speed v is limited to a dimension that must not be exceeded in order to prevent errors, damage, or quality losses. A corresponding limitation signal is sent to the ground speed regulator 17 of the tractor 2.

If none of the indicators reaches a critical value, however, a ground speed v is determined at which the combination 1 reaches at least one harvesting objective, which can be specified by the machine operator, while ensuring safe operation. Such a harvesting objective is, for example, that of reaching a high throughput rate, reaching a high quality of crop or both. In the example shown (FIG. 2), the machine operator can set a prioritization of the harvesting objectives, e.g., "density" (quality) versus "throughput," using a (e.g. virtual) sliding regulator. The sliding regulator is actuated preferably on the operating unit 11 in the driver's cab 12 in the sense of a user selection. In an extreme case, the operator selects only the density as the harvesting objective, and in another extreme case, the use selects only the throughput as the harvesting objective.

The sliding regulator makes it possible to select prioritizations located therebetween. Such operation allows accounting for both harvesting objectives simultaneously in the speed specification while also setting a user-defined weighting of the harvesting objectives relative to one another. Depending on the setting that is selected, the control device 10 then determines the ground speed v with consideration for the plurality of harvesting objectives. Advantageously, the driver is thereby relieved of the task of continuously observing the profile of the crop swath S, the engine load drop, the harvesting machine load and the crop quality.

The possible prioritization provides the advantage that even inexperienced operators can pursue a harvesting strategy (throughput and/or quality, optionally with prioritization), wherein safe operation of the assemblies and the drive engine is ensured. The speed specification, which is continuously adapted to the harvesting and machine conditions, makes it possible to advantageously operate the combination close to the performance limit.

For the particular determination of the ground speed v to be specified, the control device 10 utilizes empirically determined values, i.e., speed values that were determined for the combination by an experienced driver, for example, and are stored accordingly. Preferably, the control device 10 accounts for further technical characteristic data in the specification of the ground speed v (such as the length, weight, inertia, performance) of the towing vehicle 2, the harvesting machine 3, and/or the combination 1, in order to adapt the empirically determined values to machines such as tractors having deviating characteristic data.

As an alternative to the previously described harvesting mode, the control device 10 can be operated in a turnaround mode. The turnaround mode is activated when the tractor-harvesting machine combination reaches the end of the field (also referred to as the headland) or the end of a swath. In this case, the combination must typically perform a turnaround maneuver in order to reach the next swath. The operation in the turnaround mode therefore includes the control device 10 specifying a suitable ground speed $v_0$ for the combination 1 in order for the combination 1 to turn around at the end of the field. This ground speed $v_0$ is usually markedly higher than the previous ground speed in order to ensure that the turnaround can be carried out safely and comfortably. Advantageously, the machine operator can manually store a value in the control device 10 for the ground speed $v_0$ that is preferable for the turnaround.

A switching between the harvesting mode and the turnaround mode can take place in different manners. For instance, the operating mode can be manually selectable by the machine operator, preferably in the form of a control option via the operating unit 11.

A particularly comfortable switching is implemented in the form of an automatic, event-controlled switching. Different variants for this switching operation are feasible. For example, a crop detection system (provided by the camera 14) is used to determine whether crop G is picked up. If this is the case, the harvesting mode is activated; if this is not the case, the turnaround mode is activated. The further automatic speed control provided in the turnaround in this manner is an addition to the control in the harvesting mode, thereby relieving the driver from the task of selecting the ground speed throughout the entire use on the field.

LIST OF REFERENCE CHARACTERS 1 combination
2 tractor
3 baler
4 pickup
5 cutting device
6 feed rake
7 baling ram
8 drive shaft
9 drive engine
10 control device
11 operating unit
12 driver's cab
13 data bus system
14 camera
15 load sensor
16 moisture sensor
17 ground speed regulator
S swath
G crop
B pressed bales
v ground speed As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:

1. A combination of a towing vehicle and an agricultural harvesting machine drawn by the towing vehicle, wherein the harvesting machine comprises:
   at least one working assembly for conveying crop (G), for processing crop (G) or both;
   a working connection to the towing vehicle in order to be supplied with drive power by the towing vehicle in order to operate the at least one working assembly;
   sensors for generating sensor signals representative of operating parameters of the harvesting machine and the towing vehicle;
   a control device for ascertaining the operating parameters of the harvesting machine and the towing vehicle in reliance upon the sensor signals and for specifying a ground speed (v) for the combination; and
   an operating unit disposed in a cab of the towing vehicle receives at least one harvesting objective specified by a machine operator, wherein the control device has a harvesting mode and a turnaround mode, wherein in harvesting mode, the control device specifies the ground speed (v) for the combination depending on one or more of the ascertained operating parameters of the harvesting machine and the towing vehicle and depending upon the at least one harvesting objective specified by the machine operator.

2. The combination according to claim 1, wherein the ground speed (v) specified by the control device is selected such that the combination achieves a plurality of harvesting objectives, and wherein the machine operator further specifies a weighting of the harvesting objectives relative to one another.

3. The combination according to claim 1, wherein at least one of the harvesting objectives is that of achieving a high throughput, a high quality of crop or both.

4. The combination according to claim 1, wherein at least one variable characterizing a mechanical load of one or more of the at least one working assembly is taken into account as operating parameters of the harvesting machine.

5. The combination according to claim 1, wherein at least one variable related to the harvesting process is taken into account as operating parameters of the harvesting machine.

6. The combination according to claim 1, wherein a load of the drive engine of the towing vehicle, a current transmission ratio of the ground drive of the towing vehicle or both is taken into account as the operating parameter of the towing vehicle.

7. The combination according to claim 1, wherein the control device accounts for technical characteristic data of the towing vehicle, the harvesting machine, the combination or combinations thereof in the specification of the ground speed (v).

8. The combination according to claim 1, wherein the control device is operated to set an upper limit for the ground speed (v) if a value of an operating parameter or values of a combination of operating parameters indicates that an overload is imminent.

9. The combination according to claim 1, wherein the ground speed (v) is specified by the control device depending on the operating parameters is based on empirically determined values.

10. The combination according to claim 1, wherein the control device is assigned to the harvesting machine and wherein the control device is brought into a signal connection with the towing vehicle in order to receive operating parameters ascertained on the towing vehicle.

11. The combination according to claim 1, wherein the agricultural harvesting machine drawn by the towing vehicle is in particular a baler or a self-loading forage harvester.

12. The combination according to claim 4, wherein at least one variable characterizing the mechanical load of one or more of the at least one working assembly include any of the group consisting of speed, torque, working pressure and combinations thereof.

13. The combination according to claim 5, wherein the at least one variable related to the harvesting process is any of the group consisting of the crop, the crop volume, the bale density, the packet size, the throughput and combinations thereof.

14. The combination according to claim 10, wherein the signal connection implemented as a bus system.

15. The combination according to claim 1, wherein at least one switching from the operation of the control device in the turnaround mode into the harvesting mode takes place automatically in an event-controlled manner.

16. A combination of a towing vehicle and an agricultural harvesting machine drawn by the towing vehicle, wherein the harvesting machine comprises:

at least one working assembly for conveying crop (G), for processing crop (G) or both;

a working connection to the towing vehicle in order to be supplied with drive power by the towing vehicle in order to operate the at least one working assembly;

sensors for generating sensor signals representative of operating parameters of the harvesting machine and the towing vehicle;

an operating unit disposed in a cab of the towing vehicle receives at least one harvesting objective specified by a machine operator; and a control device for ascertaining the operating parameters of the harvesting machine and the towing vehicle in reliance upon the sensor signals and for specifying a ground speed (v) for the combination, wherein the control device has two modes of operation: a harvesting mode and a turnaround mode;

wherein the control device switches automatically between the harvesting mode and the turnaround mode, wherein in the harvesting mode, the control device specifies the ground speed (v) for the combination depending on one or more of the ascertained operating parameters of the harvesting machine and the towing vehicle, such that the combination achieves the at least one harvesting objective specified by the machine operator, while ensuring safe operation; and wherein in the turnaround mode, the control device selects the ground speed for the combination to turn the combination around at the end of a the field.

17. The combination according to claim 16, wherein a switching between an operation of the control device in the harvesting mode and the turnaround mode is manually initiated by the machine operator.

18. The combination according to claim 16, wherein at least one switching from the operation of the control device in the turnaround mode into the harvesting mode takes place automatically in an event-controlled manner.

* * * * *